United States Patent [19]

Takagi

[11] Patent Number: 4,706,125

[45] Date of Patent: Nov. 10, 1987

[54] IMAGE READING DEVICE

[75] Inventor: Kazuhiko Takagi, Nagoya, Japan

[73] Assignee: Brother Kogyo Kabushiki Kaisha, Aichi, Japan

[21] Appl. No.: 854,762

[22] Filed: Apr. 23, 1986

[30] Foreign Application Priority Data

Apr. 27, 1985 [JP] Japan .................................. 60-92107
Apr. 27, 1985 [JP] Japan ............................ 60-64126[U]
Apr. 27, 1985 [JP] Japan ............................ 60-64127[U]

[51] Int. Cl.$^4$ .......................................... H04N 1/00
[52] U.S. Cl. .................................... 358/256; 358/294
[58] Field of Search ............... 358/256, 294, 293, 285; 382/65, 58; 250/578; 271/226

[56] References Cited

U.S. PATENT DOCUMENTS

| | | | |
|---|---|---|---|
| 4,148,076 | 4/1979 | Costello et al. | 358/294 |
| 4,422,100 | 12/1983 | Duvall et al. | 358/294 |
| 4,486,786 | 12/1984 | Sato et al. | 358/294 |
| 4,609,946 | 9/1986 | Thaler | 358/294 |

Primary Examiner—Edward L. Coles, Sr.
Attorney, Agent, or Firm—Parkhurst & Oliff

[57] ABSTRACT

An image reading device for reading images on a recording medium, including a support member for supporting the recording medium, an image-reading unit having a reading portion for reading the images on the recording medium, and a movable guide member. The reading portion is disposed near the support member so that the reading portion is movable between a reading position for reading the images, and, and an inoperative position. The movable guide member is disposed near the support member so that the guide member is movable between a retracted position in which the guide member does not interfere with the reading portion in the reading position, and a guiding position for directing the recording medium along a part of a predetermined path along which the recording medium is inserted. The movable guide member is held in the retracted and guiding positions while the reading portion is placed in the reading and inoperative positions, respectively.

14 Claims, 5 Drawing Figures

FIG. 5
(a)
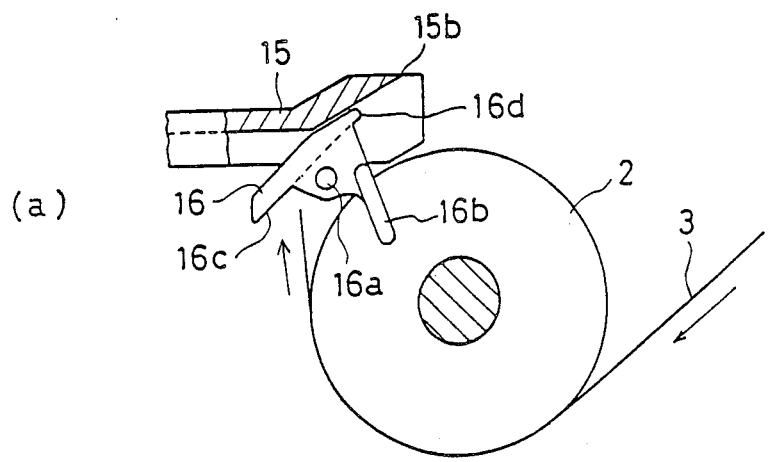
(b)
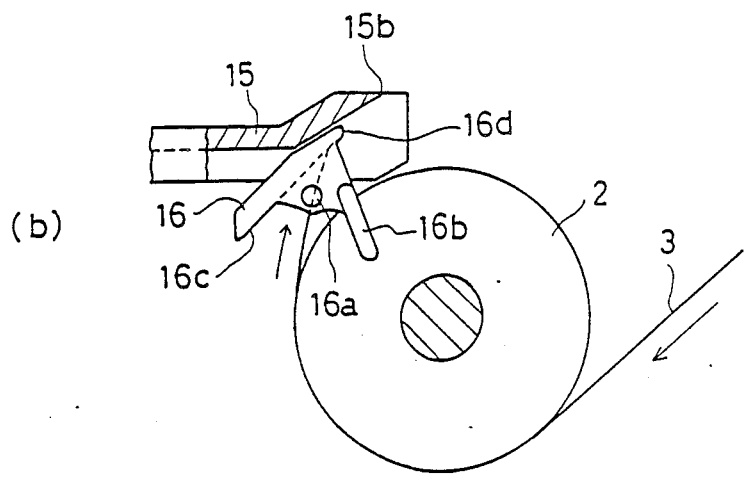

IMAGE READING DEVICE

BACKGROUND OF THE INVENTION

1. Field of the Invention

The present invention relates to an image reading device capable of reading images on a recording medium, and more particularly to a guide member for directing the recording medium along a predetermined path when the medium is inserted into the device so as to be supported by a support member.

2. Related Art Statement

In a known image reading device, an image reading unit has a reading portion which is movable between a reading position for reading images on a recording medium supported on a suitable support member, and a retracted inoperative position away from the recording medium on the support member. The recording medium is inserted along the supporting surface of the support member, with the reading portion located at its inoperative position. As the images on the recording medium are read by the reading portion in its reading position, the recording medium is fed along a predetermined feed path, with the leading end passing through an outlet end of the path.

When the image reading device is loaded with a recording medium, the medium is passed through an area in which the reading portion is moved between the reading and inoperative positions. Since any members for guiding the recording medium along the predetermined path are not allowed to exist within the area of movement of the reading portion, the recording medium may not be correctly guided along the path, with the leading end failing to be directed toward the outlet of the feed path along the supporting surface of the support member. In some instance, the reading device is jammed with the inserted recording medium.

The known image reading device indicated above suffers another inconvenience that the recording medium tends to be spaced away from the supporting surface of the support member, at their portions opposite to the reading portion of the image-reading unit. A distance of this spacing between the medium and the supporting surface of the support member is varied depending upon the specific nature and thickness of the recording medium. Whereas, a clearance between the reading portion and the surface of the recording medium should be kept constant for correct or accurate reading of the images by the image-reading unit.

SUMMARY OF THE INVENTION

It is therefore an object of the present invention to provide an image reading device wherein the recording medium is suitably inserted along a predetermined path, with the leading end being properly guided through an area of movement of a reading portion of an image-reading unit between its reading and inoperative positions.

Another object of the invention is the provision of such an image reading device wherein a part of the recording medium opposite to the reading portion is held in contact with the surface of a support member.

According to the present invention, there is provided an image reading device for reading images on a recording medium, comprising: a support member for supporting the recording medium; an image-reading unit including a reading portion which is disposed near the support member, and is movable between a reading position adjacent to the support member, for reading the images on the recording medium supported by the support member, and an inoperative position spaced from the reading position in a direction away from the support member; and a movable guide member disposed near the support member, and movable between a retracted position in which the guide member does not interfere with the reading portion of the image-reading unit in the reading position, and a guiding position for leading or guiding the recording medium along a part of a predetermined path along which the recording medium is inserted, the movable guide member being held in the retracted and guiding positions while the reading portion is placed in the reading and inoperative positions, respectively.

In the image reading device of the present invention constructed as described above, the recording medium is inserted with the reading portion placed in its inoperative position, and with the movable guide member placed in its guiding position. When the recording medium is fed in this condition, for example, through rotation of the support member, the leading portion of the medium is properly guided by the guide member, even along a part of the path opposite to the reading portion. When the images are read by the image-reading unit, the reading portion is moved to its reading position, while the movable guide member is moved to its retracted position at which the guide member does not interfere with the reading portion in the reading position.

According to one advantageous feature of the invention, the movable guide member has a portion which contacts the recording medium so as to hold a part of the recording medium opposite to the reading portion, in contact with a supporting surface of the support member, when the guide member is placed in the retracted position. In this arrangement, the above-indicated portion of the guide member in the retracted position serves to prevent the above-indicated part of the recording medium from being spaced away from the supporting surface of the support member, thereby maintaining a predetermined constant clearance between the reading portion and the recording medium. In the instant case, the guide member serves the two different functions, depending upon the currently selected position. Namely, the guide member, when placed in its guiding position, guides the leading end of the medium along the part of the path opposite to the reading portion, and when placed in the retracted position, holds the corresponding part of the medium in contact with the supporting surface of the support member. Thus, the movable guide member eliminates any member designed exclusively for maintaining the predetermined clearance between the reading portion and the medium, resulting in structural simplicity and reduced cost of manufacture of the image reading device.

According to another advantageous feature of the present invention, the image reading device further comprises a mechanical linkage for operatively connecting the image-reading unit and the movable guide member to each other, such that the movable guide member is moved to the retracted and guiding positions when the reading portion is moved to the reading and inoperative positions, respectively.

In one form of the above feature, the mechanical linkage includes: a rotary cam which has a peripheral cam surface and is rotated in synchronization with a movement of the reading portion between the reading and inoperative positions; a cam follower fixed to the movable guide member; and biasing means for biasing the cam follower to hold the cam follower in contact with the peripheral cam surface of the rotary cam.

According to a further advantageous feature of the invention, the image reading device further comprises an optical-sensitivity checking member for checking the image-reading unit for its sensitivity. When the checking member operates to effect the sensitivity checking, it is positioned opposite to the reading portion in the reading position. In this case, the device may further comprise a mechanical linkage for operatively connecting the optical-sensitivity checking member to the image-reading unit such that the checking member is moved to the operative position when the reading portion is moved to the reading position, and to an inoperative position thereof spaced away from the operative position thereof when the reading portion is moved to the inoperative position thereof.

According to a still further advantageous features of the invention, the reading portion and the guide member are pivotally movable between the reading and inoperative positions, and between the retracted and guiding positions, respectively.

According to yet another advantageous feature of the invention, the support member is a cylindrical platen rotatable about an axis thereof, and the image reading device further includes: a stationary guide member disposed under the cylindrical platen, and having a guide surface formed substantially along a circumferential surface of the platen so as to guide the recording medium; a carriage movable along the axis of the platen; a card holder fixed to the carriage and disposed adjacent to the circumferential surface of the platen, above the stationary guide member and below the movable guide member; and a covering member disposed above the movable guide member and cooperating with a housing of the image reading device to define an outlet through which the recording medium is fed out. The cylindrical platen, the stationary guide member, the card holder, the movable guide member and the covering member, cooperating with each other to define the predetermined path leading to the outlet.

BRIEF DESCRIPTION OF THE DRAWING

The above and other objects, features and advantages of the present invention will become more apparent from reading the following detailed description of a preferred embodiment of the invention, when considered in connection with the accompanying drawing, in which:

FIGS. 5(a) and 5(b) are views showing different operating positions of a movable guide member of the apparatus.

DETAILED DESCRIPTION OF THE PREFERRED EMBODIMENT

For the purpose of illustration, there will be described in detail the preferred embodiment of an image reading device of the invention incorporated in a printing apparatus, referring to the accompanying drawings.

Figure 1:
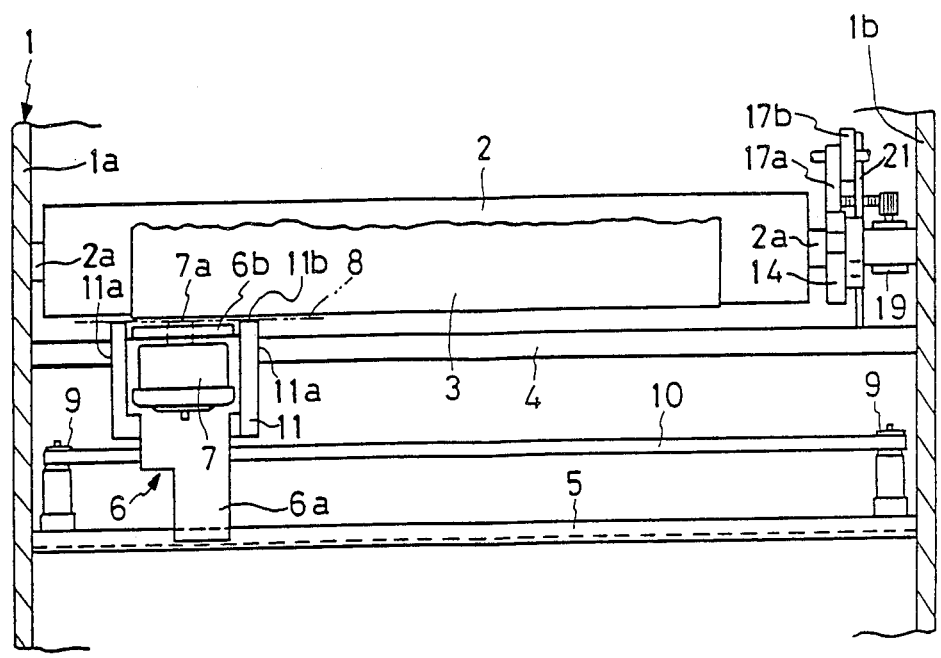
FIG. 1 is a fragmentary plan view of a printing apparatus incorporating one embodiment of an image reading device of the present invention.
Figure 2:
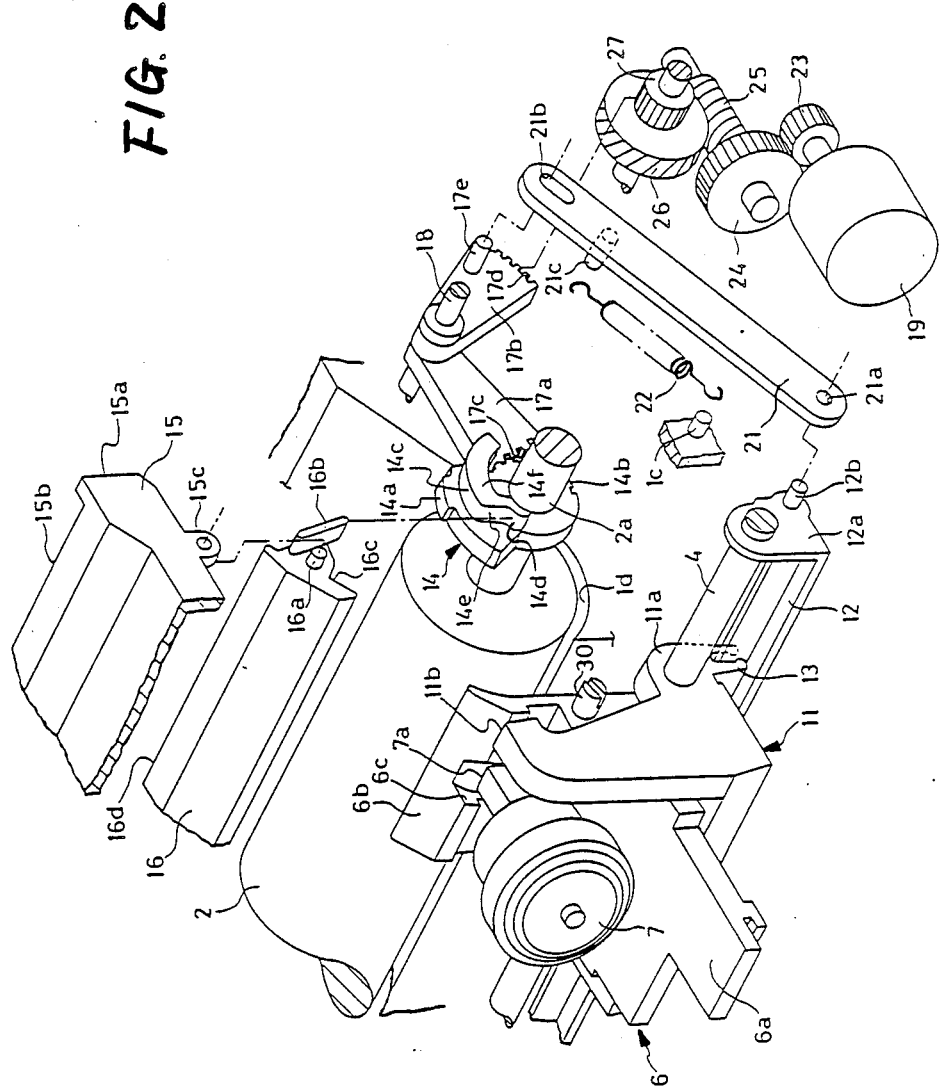
FIG. 2 is a fragmentary exploded view in perspective of the printing apparatus of FIG. 1.

There is shown in FIGS. 1 and 2 a structural arrangement of the printing apparatus, wherein reference numeral 2 indicates a generally elongate platen for supporting a recording medium in the form of a sheet of paper 3 (FIG. 1). The platen 2 extends along a line of printing to be effected on the sheet of paper 3, and has small-diameter portions 2a at its opposite longitudinal ends. The platen 2 is rotatably supported at the small-diameter portions 2a by a pair of side walls 1a, 1b of a frame 1 of the printing apparatus. The platen 2 is rotated about its axis to feed the paper 3 in a direction perpendicular to the axis of the platen 2. In front of the platen 2, there are disposed a guide rod 4 and a guide rail 5 which are supported by the pair of side walls 1a, 1b, so as to extend parallel to the platen 2.

Figure 3:
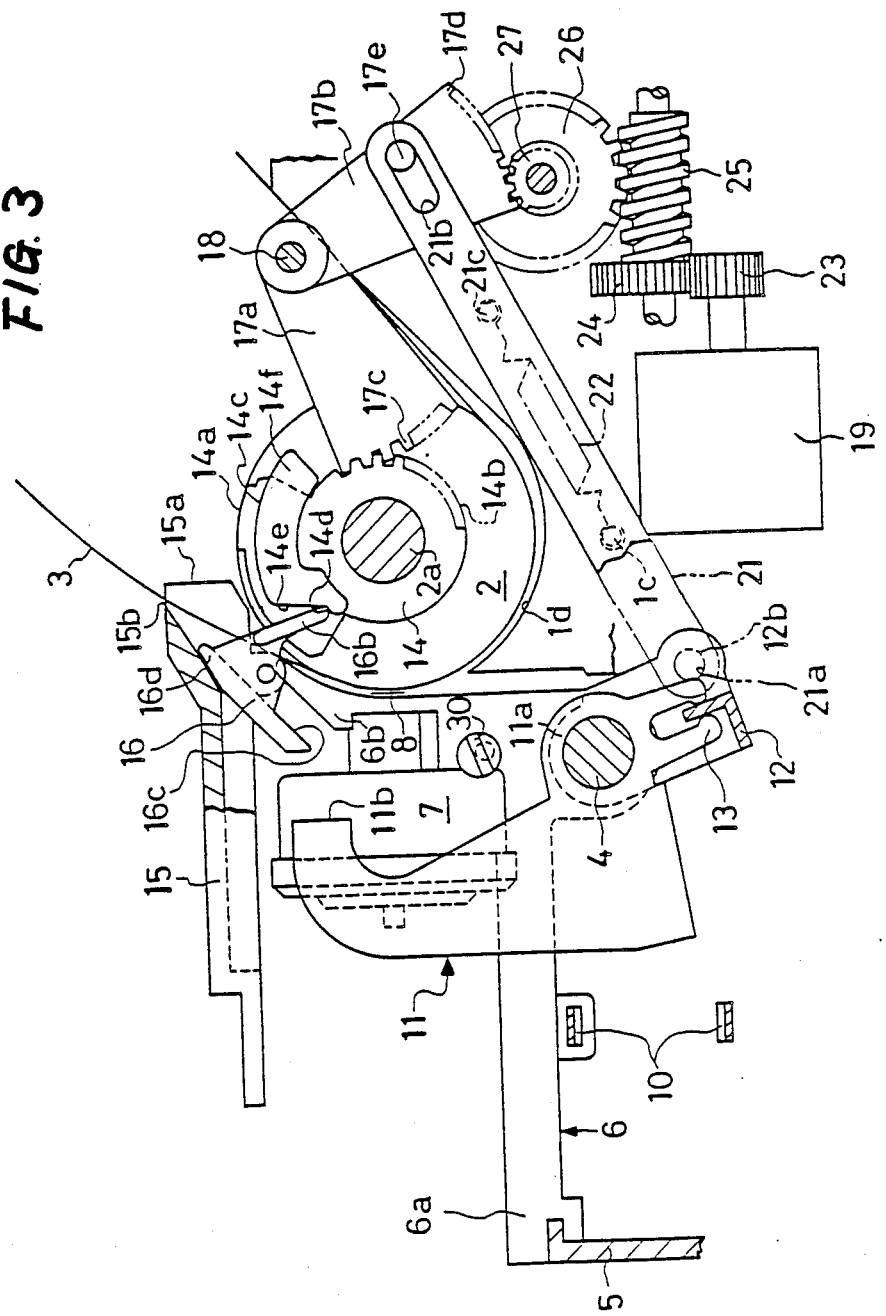
FIGS. 3 and 4 are fragmentary side elevational views partly in cross section of the printing apparatus, showing different operating positions of various members.
Figure 4:
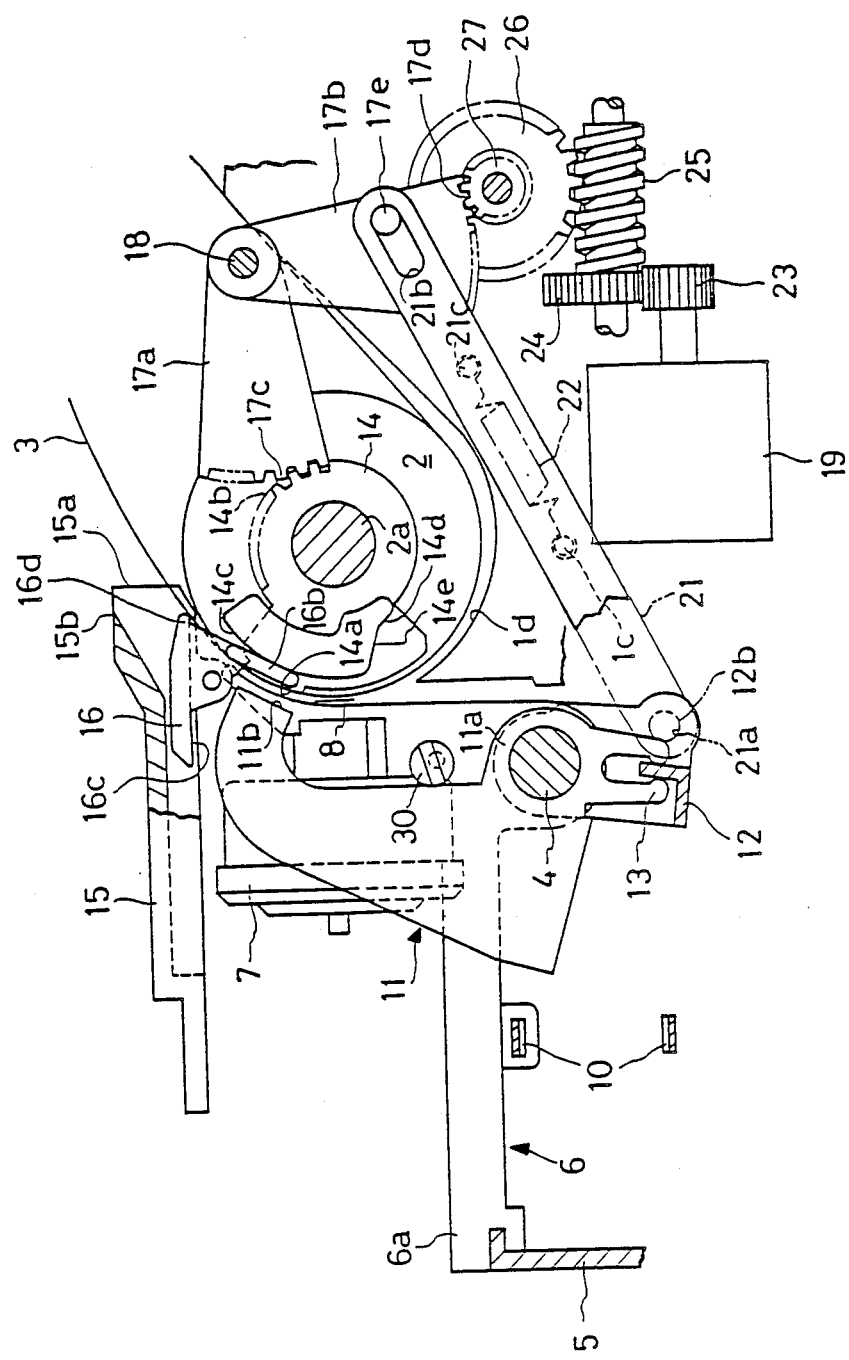

As also indicated on FIGS. 3 and 4, a carriage 6 is slidably supported on the guide rod 4 and the guide rail 5. The carriage 6 has a plate-like front extension 6a which slidably engage the guide rail 5. The carriage 6 further has a card holder 6b on the side opposite to the platen 2. The card holder 6b is curved along the circumferential supporting surface of the platen 2, and is spaced a suitable distance away from the supporting surface of the platen 2. As indicated in FIG. 2, the card holder 6b has an aperture 6c in its central portion. A printing head 7 is mounted on the carriage 6 such that a printing portion 7a extends through the aperture 6c in the card holder 6b and is positioned opposite to the platen 2, as shown in FIG. 1. Between the printing portion 7a and the surface of the platen 2, an active portion of an ink ribbon 8 is passed, so that the printing portion 7a effects printing on the paper 3 via the ink ribbon 8. The ribbon 8 is supplied from a known cassette (not shown) supported on the frame 1 in a suitable manner. The carriage 6 is slidably moved on the guide rod 4 and the guide rail 5 along the platen 2, by a suitable drive motor via a timing belt 10 which connects the carriage 6 and the drive motor through pulleys 9 rotatably supported by the frame 1. With the carriage 6 reciprocated along the platen 2, the printing head 7 is operated to effect printing on the paper 3 on the platen 2, via the ribbon 8.

The guide rod 4, which has a circular cross sectional shape, is also used to slidably support an image-reading unit 11. More specifically, the image-reading unit 11 has a pair of support portions 11a which have bores engaging the guide rod 4, as indicated in FIGS. 2–4. The support portions 11a, 11a are spaced apart from each other by a suitable distance along the guide rod 4, such that the carriage 6 is sandwiched between the support portions 11a, 11a in the direction of extension of the guide rod 4. Thus, the carriage 6 and the image-reading unit 11 are slidably movable as a unit on the guide rod 4. Further, the image-reading unit 11 is pivotable about an axis of the guide rod 4, relative to the carriage 6, as described later in detail. The image-reading unit 11 has a reading portion 11b at its upper end. With clockwise and counterclockwise pivotal movements of the image-reading unit 11, the reading portion 11b is moved between its reading and inoperative positions. In the reading position indicated in FIG. 4, the reading portion 11b is positioned adjacent and opposite to platen 2, and above the active portion of the ink ribbon 8. The image-reading unit 11 incorporates various optical and other components, such as a multiplicity of light-emitting elements, light-sensitive elements, light-emitting optical fibers for transmitting light beams from the light-emitting elements to the surface of the paper 3, and light-receiving optical fibers for transmitting light beams reflected from the paper 3 to the light-sensitive elements. Since the arrangement within the image-reading unit 11 and the manner of reading the images on the paper 3 are not essential to the understanding of the concept of the present invention, no further description thereof will be provided herein. The structural and operational details are described in U.S. patent application Ser. Nos. 726,314 and 813,510 filed Apr. 24 and Dec. 26, 1985, respectively.

An elongate actuator member 12 is disposed below the guide rod 4, so as to extend parallel to the rod 42. The actuator member 12 has a pair of support portions 12a (FIG. 2) at its opposite longitudinal ends, and is supported at the support portions 12a by the guide rod 4 so that the actuator member 12 is pivotable about the axis of the guide rod 4. In the meantime, one of the support portions 11a of the image-reading unit 11 on the side of the reading portion 11b, is formed with a bifurcated engagement portion 13 which slidably engage the actuator member 12 so as to sandwich the same. The actuator member 12 is pivotally operated between two positions by a drive motor 19 via a mechanical linkage (which will be described) which is connected t its one end to a pin 12b extending from the support portion 12a of the actuator member 12 parallel to the guide rod 4. With the actuator member 12 operated between its two positions, the image-reading portion 11 is pivotally operated such that its reading portion 111b is moved between its reading position of FIG. 4 adjacent to the platen 2, for reading the images on the paper 3, and its inoperative position of FIG. 3 which is spaced from the reading position in a direction away from the platen 2.

The carriage 6 has a stopper in the form of a pin 30 which extends from the right-hand side surface of the carriage 16, so that it is abutable on the image-reading unit 11, to determine the reading position of the reading portion 11b. The stopper pin 30 is eccentrically rotatable so as to adjust its stop position, i.e., so as to adjust the reading position of the reading portion 11b.

The right-hand side small-diameter portion 2a of the platen 2 carries an optical-sensitivity checking member 14 fitted thereon. The checking member is slidably pivotable on the small-diameter portion 2a, about its axis, i.e., about the axis of the platen 2. The checking member 14 has a reflector surface 14a having a predetermined reflectance of light which is used as a reference for checking the image-reading unit 11 for its optical sensitivity. The reflector surface 14a is provided on a part of the outer peripheral surface of the checking member 14. The checking member 14 further has a plurality of teeth 14b on another part of its outer peripheral surface. A periphery cam 14f is formed on the right-hand side surface (as seen in FIG. 2) of the checking member 14, as an integral part of the latter member 14. This periphery cam 14f has a peripheral cam surface consisting of a first surface 14c, a second surface 14d positioned inwardly with respect to the first surface 14c in the radial direction of the small-diameter portion 2a of the platen 2, and a third surface 14e which connects the first and second surfaces 14c and 14d with a moderate curve.

A covering member 15 is removably attached to the frame 1 so as to cover the printing head 7, image-reading unit 11 and a part of the platen 2. The covering member 15 has an end portion 15a which cooperates with the frame 11 to define an outlet through which the sheet of paper 3 fed along a predetermined path is ejected in an obliquely upward direction away from the printing apparatus, as indicated in FIGS. 3 and 4. The covering member 15 further has a cutter 15b formed by the upper edge of the end portion 15a. The cutter 15b is used for cutting off the paper 3.

Between the covering member 15 and the platen 2, there is pivotally supported a movable guide member 16 which extends along the platen 2. The guide member 16 has, at its opposite longitudinal ends, a pair of pins 16a which engage holes formed in a corresponding pair of downward projections 15c provided on the bottom surface of the covering member 15. The guide member 16 is biased in the counterclockwise direction (as viewed in FIG. 3) by a spring (not shown) which acts on one of the pins 16a which is not shown in FIG. 2. Under the biasing force of this spring, the guide member 16 is normally held at its guiding position of FIG. 3. The movable guide member 16 is formed with an actuator portion 16b at one of the longitudinal ends on the side of the pin 16a shown in FIG. 2. The actuator portion 16b is adapted to be held in contact with the peripheral cam surface of the periphery cam 14f.

Two pivotable members 17a and 17b are supported by a shaft 18, adjacent to and in the rear of the checking member 14, such that the two pivotable members 17a and 17b are pivotable about the shaft 18 as a unit. The first pivotable member 17a has a sector gear 17c at its one end. The sector gear 17c has teeth meshing the teeth 14b of the checking member 14. Similarly, the second pivotable member 17b has a sector gear 17d having teeth which mesh with a gear 27 in a gear train which will be described. The second pivotable member 17b has a pin 17e fixed thereto. With the first and second pivotable members 17a, 17b pivoted in clockwise and counterclockwise directions by the motor 19 via the pin 17e and other members of the mechanical linkage, the checking member 14 is rotated through engagement of its teeth 14b with the gear 17c, between its operative position of FIG. 4, and its inoperative position of FIG. 3. In the operative position, the reflector surface 14a is positioned opposite to the reading portion 11b of the image-reading unit 11 placed in its reading position, as indicated in FIG. 4. The inoperative position is spaced rearwardly of the operative position in the circumferential direction of the platen 2. Namely, the reflector surface 14a is misaligned with the reading portion 11b of the image-reading unit 11 when the checking member 14 is placed in its inoperative position, as indicated in FIG. 3.

At the same time, the pivotal movements of the first pivotable member 17a cause the rotary periphery cam 14f to be rotated with the checking member 14. As a result, the movable guide emmber 16 is pivoted between its guiding position of FIG. 3 and its retracted position of FIG. 4, through sliding contact of the cam surface 14c, 14d, 14e with the actuator member 16b. More specifically, when the guide member 16 is placed in the guiding position with the actuator portion 16b engaging the second cam surface 14d of the cam 14f, the guide member 16 servies to lead or guide the leading portion of the inserted paper 3 along the circumferential surface of the platen 2, and through the outlet partially defined by the end portion 15a of the covering member 15. With the checking member 14 moved to the operative position of FIG. 4, the movable guide member 16 is moved to its retracted position of FIG. 4, with the actuator portion 16b slidably moved on the third cam surface 14e up to the first can surface 14c. In this retracted position, the guide member 16 will not interfere with the reading portion 11b which is placed in the reading position.

To the inner surface of the right side wall 1b of the frame 1, there is secured the previously indicated drive motor 19 which is operable in opposite directions. As indicated before, the second pivotable arm 17b is operatively connected at its pin 17e to the drive motor 19, via the mechanical linkage which includes the previously indicated gear train consisting of gears 23, 24, 25, 26 and 27. With the drive motor 19 operated, the first and second pivotable members 17a, 17b are pivoted in opposite directions about the shaft 18, whereby the checking member 14 and the guide member 16 are pivotally moved between their operative or guiding position and their inoperative or retracted position.

The linkage further comprises a connecting rod 21 which has a round hole 21a and an elongate hole 21b formed in the opposite longitudinal ends, respectively. The previously indicated pins 12b and 17e slidable fitted in the corresponding holes 21a, 21b d round holes 21a, 21b. The connecting rod 21 and the frame 1 have a pin 21c and a pin 1c fixed thereto, respectively. The connecting rod 21 is biased, by a spring 22 connected to the pins 21c and 1c, toward the pin 12b of the actuator member 12. Consequently, the image-reading unit 11 and the pivotable members 17a, 17b are biased in the clockwise direction as viewed in FIG. 3. In this condition, the pin 17e on the second pivotable member 17b is held in contact with the outward end of the elongate hole 21b in the connecting rod 21.

When the drive motor 19 is operated in the clockwise or counterclockwise direction, the rotary motion of the motor 19 is imparted to the second pivotable member 17b, whereby the pivotable member 17b is pivoted. As a result, the actuator member 12 is pivoted via the connecting rod 21, and the image-reading unit 11 is pivoted. At the same time, the checking member 14 and the periphery cam 14f are pivoted in synchronization with the pivotal movement of the image-reading unit 11, via the second pivotable member 17a. Further, the guide member 16 is also pivoted via the periphery cam 14f. Thus, the image-reading unit 11 and the guide member 16 are operatively connected to each other by the linkage which includes the connecting rod 21, first and second pivotable members 17a, 17b and periphery cam 14f.

As previously described and as indicated in FIG. 4, the stopper pin 30 is adapted to be abuttable on the image-reading unit 11, in order to determine the reading position of the reading portion 11b, and therefore the operative position of the checking member 14.

The operation of the printer with the image reading device constructed as described above will be described.

To load the printer with the sheet of paper 3, the drive motor 19 is operated in the reverse direction so as to pivot the first and second pivotable members 17a, 17b in the counterclockwise direction (as seen in FIG. 3) through the gear train 23-27, and the connecting rod 21 is moved against a biasing action of the spring 22. As a result, the image-reading unit 11 is pivoted in the counterclockwise direction, whereby the reading portion 11b is moved to its inoperative position of FIG. 3. Concurrently, the checking member 14 and the cam 14f are rotated in the clockwise direction, whereby the reflector surface 14a is moved to its inoperative position, and the movable guide member 16 is moved to its guiding position with the actuator portion 16b contacting the second surface 14d of the cam 14f. In this condition, the paper 3 is inserted from under the platen 2, being guided by a stationary guide disposed under the platen 2. As indicated in FIG. 3, this stationary guide 1d has a guide surface formed substantially along the circumferential surface of the platen 2 so as to guide the paper 3 along the surface of the platen 2. With the platen 2 slowly rotated, the paper 3 is advanced with its leading end being properly guided between the platen 2 and the stationary guide member 1d. After the leading end of the paper 3 has passed through the card holder 6b and reached an area of movement of the reading portion 11b, the leading portion of the paper 3 tends to take a generally straight path tangent to the circumference of the platen 2, as indicated in FIG. 5(a), deviating from the predetermined path along the circumference of the platen 2. However, the otherwise continuing deviation of the actual path of the paper 3 is prevented by the movable guide member 16 which is currently placed in its guiding position adjacent to the platen and in the area of movement of the reading portion 11b. Namely, the leading portion of the paper 3 is guided along a lower surface 16c of the guide member 16, as indicated in FIG. 5(b), and directed toward the outlet of the path defined by the end portion 15b and the frame 1. Thus, the movable guide member 16 in its guiding position serves to properly guide the paper 3 along a part of the predetermined path opposite to the reading portion 11b of the image-reading device 11 in the inoperative position, thereby preventing the paper 3 from deviating from the predetermined path with sharp bending at its leading end.

Before the images on the paper 3 are read by the image-reading unit 11, the optical sensitivity of the unit 11 is checked with the optical-sensitivity checking member 14 moved to its operative position. Described in more detail, the carriage 6 is moved to the right on the guide rod 4 by the timing belt 10 driven by a suitable motor, until the reading portion 11b is moved to a position corresponding to the position of the checking member 14. Then, the motor 19 is operated in the forward direction, to pivot the first and second pivotable members 17a, 17b in the clockwise direction (in FIG. 3) through the gear train 23–27. Consequently, the connecting rod 21 is allowed to be moved by the biasing force of the spring 22, causing the image-reading unit 11 to be pivoted clockwise until it is brought into abutment on the stopper pin 30. Thus, the reading portion 11b is placed in the reading position of FIG. 4. Concurrently, the checking member 14 with the periphery cam 14f is rotated in the counterclockwise direction, and brought into its operative position in which the reflector surface 14a faces the reading portion 11b. Further, the movable guide member 16 is pivoted to its retracted position, with the actuator portion 16b being slidably moved on the third cam surface 14e up to the first surface 14c. With the checking member 14 held in the operative position, beams of light are emitted from the reading portion 11b, and the sensitivity of the image-reading unit is checked based on the amounts of the light beams reflected by the reflector surface 14a. The manner of this optical sensitivity checking is not essential to the understanding of the present invention, and no detailed description thereof will be provided herein. After the optical sensitivity of the image-reading unit 11 is completed, the images on the paper 3 are read by the image-reading unit 11 while the carriage 6 is reciprocated along the platen 2. During the reading operation, the rear end portion 16d of the guide member 16 placed in its retracted position serves to hold a part of the paper 3 opposite to the reading portion 11b in contact with the supporting surface of the platen 2. Thus, the above-indicated part of the paper 3 is prevented from lifting away from the surface of the platen 2, and consequently the clearance between the paper 3 and the reading portion 11b may be maintained at the predetermined value suitable for maximum reading accuracy of the image-reading unit 11.

The amounts of operation of the drive motor 19 in the forward and reverse directions to determine the operating range of the pivotable member 17b are controlled by limit switches (not shown), which turn off the motor 19 when the motor 19 has been operated by the predetermined amounts. Should the second pivotable member 17b be pivoted in the clockwise direction by an excessive amount, the pin 17e may be moved within the elongate hole 21b, from the rear end toward the front end, so as to prevent the image-reading unit 11b from being forcibly pushed against the stopper pin 30. For this purpose, the hole 21b is elongated.

When printing is effected on the paper 3 by the printing head 7, the motor 19 is operated to bring the reading portion 11b and the movable guide member 16 to their inoperative and guiding positions of FIG. 3, respectively, in the same manner as previously described in connection with the manner of inserting the paper 3. With the guide member 16 in the guiding position, the carriage 6 and the printing head 7 on the carriage 6 are reciprocated along the guide rod 4 and the platen 2. During the reciprocating movements of the printing head 7, the printing portion 7a effects printing on the paper 3 via the ink ribbon 8. In the case where the paper 3 is a web, the web is cut by the cutter 15b at the rear end of the covering member 15, after a desired printing operation is completed. In the present embodiment, the guide member 16 is disposed considerably close to the printing portion 7a, i.e., within the area of movement of the reading portion 11b, and the cutter 15b is located relatively close to the printing portion 7a. Consequently, the waste length of the web between the printing portion 7 and the leading end of the web 3 cut by the cutter 15a may be held relatively small, when the printing is performed after the web 3 is cut by the cutter 15b. Since the reading portion 11b and the reflector surface 14a are maintained in their inoperative positions away from the printing portion 7a during the printing operation, they are protected against otherwise possible contamination by particles of ink material removed from the ink ribbon 8.

What is claimed is:

1. An image reading device for reading images on a recording medium, comprising:
    a support member for supporting the recording medium;
    an image-reading unit including a reading portion which is disposed near said support member, and is movable between a reading position adjacent to said support member, for reading the images on the recording medium supported by said support member, and an inoperative position spaced from said reading position in a direction away from said support member; and
    a movable guide member disposed near said support member, and movable between a retracted position in which the guide member does not interfere with said reading portion of said image-reading unit in said reading position, and a guiding position for guiding the recording medium along a part of a predetermined path along which the recording medium is inserted, said movable guide member being held in said retracted and guiding positions while said reading portion is placed in said reading and inoperative positions, respectively.

2. An image reading device according to claim 1, wherein said movable guide member has a portion which contacts the recording medium so as to hold a part of the recording medium opposite to said reading portion, in contact with a supporting surface of said support member, when said guide member is placed in said retracted position.

3. An image reading device according to claim 1, further comprising a mechanical linkage for operatively connecting said image-reading unit and said movable guide member to each other, such that said movable guide member is moved to said retracted and guiding positions when said reading portion is moved to said reading and inoperative positions, respectively.

4. An image reading device according to claim 3, wherein said movable guide member has a portion which contacts the recording medium so as to hold a part of the recording medium opposite to said reading portion, in contact with a supporting surface of said support member, when said guide member is placed in said retracted position.

5. An image reading device according to claim 1, further comprising an optical-sensitivity checking member for checking said image-reading unit for its sensitivity, said checking member being positioned opposite to said reading portion in said reading position.

6. An image reading device according to claim 5, further comprising a mechanical linkage for operatively connecting said optical-sensitivity checking member to said image-reading unit such that said checking member is moved to an operative position thereof when said reading portion is moved to said reading position, and to an inoperative position thereof spaced away from said operative position thereof when said reading portion is moved to said inoperative position thereof.

7. An image reading device according to claim 3, wherein said mechanical linkage has an optical-sensitivity checking member for checking said image-reading unit for its sensitivity, said checking member being moved to an operative position thereof when said reading portion of the image-reading unit is moved to said reading position, said checking member in said operative position thereof being opposite to said reading portion in said reading position.

8. An image reading device according to claim 1, wherein said reading portion and said guide member are pivotally movable between said reading and inoperative positions, and between said retracted and guiding positions, respectively.

9. An image reading device according to claim 1, wherein said support member is a cylindrical platen rotatable about an axis thereof, and further comprisisng:

a stationary guide member disposed under said cylindrical platen, and having a guide surface formed substantially along a circumferential surface of said platen so as to guide the recording medium;

a carriage movable along the axis of said platen;

a card holder fixed to said carriage and disposed adjacent to said circumferential surface of said platen, above said stationary guide member and below said movable guide member; and a covering member disposed above said movable guide member and cooperating with a housing of the image reading device to define an outlet through which the recording medium is fed out, said cylindrical platen, said stationary guide member, said card holder, said movable guide member and said covering member, cooperating with each other to define said predetermined path leading to said outlet.

10. An image reading device according to claim 3, wherein said mechanical linkage includes:

a rotary cam which has a peripheral cam surface and is rotated in synchronization with a movement of said reading portion between said reading and inoperative positions;

a cam follower fixed to said movable guide member; and biasing means for biasing said cam follower to hold said cam follower in contact with said peripheral cam surface of said rotary cam.

11. An image reading device according to claim 10, wherein said mechanical linkage further includes:

a pivotable member operatively connected to a drive source and said rotary cam, and pivotally supported to rotate said rotary cam in opposite directions, said pivotable member being pivoted by said drive source between a first and second positions corresponding to said guiding and retracted positions of said movable guide member, respectively;

a connecting rod connecting to said pivotable member; and an actuator member connected to said connecting rod and pivotally supported for pivoting said image-reading unit so as to move said reading portion between said inoperative and reading positions, said actuator member being pivoted by said connecting rod to move said reading portion to said inoperative and reading positions when said pivotable member is moved to said first and second positions to move said movable guide member to said guiding and retracted positions, respectively.

12. An image reading apparatus according to claim 11, wherein said support member is a cylindrical platen having a small-diameter portion at one end thereof, said rotary cam being slidably mounted on said small-diameter portion, so that the rotary cam is rotated through engagement thereof with said pivotable member.

13. An image reading apparatus according to claim 12, further comprising a guide rod having a circular shape in transverse cross section, said iamge reading device being supported by said guide rod slidably about an axis of said guide rod, said actuator member including an elongate operating portion which extends along said guide rod, and a pair of support portions which extend from opposite ends of said operating portion substantially perpendicular to said operating portion, said actuator member being supported at said support portions thereof by said guide rod pivotally about the guide rod, said elongate operating portion slidably engaging said image-reading unit so as to permit the image-reading unit to move relative to said operating portion along said guide rod, said connecting rod being connected to one of said support portions so as to pivot said actuator member about said guide rod.

14. An image rading device according to claim 10, further comprising an optical-sensitivity checking member integral with said rotary cam, said checking member being operatively connected by said mechanical linkage to said image reading unit such that said checking member is moved to an operative position thereof when said reading portion of the image-reading unit is moved to said reading position, and to an inoperative position thereof spaced away from said operative position thereof when said reading portion is moved to said inoperative position thereof, said checking member in said operative position thereof being positioned opposite to said reading portion in said reading position, so as to check said image-reading unit for its optical sensitivity.

* * * * *